United States Patent [19]

Butler et al.

[11] 4,286,798
[45] Sep. 1, 1981

[54] TRUCK WITH STEERABLE REAR WHEELS

[76] Inventors: Claude O. Butler, 11270 Chalet Rd., R.R. #1, Sidney, B.C., Canada, V8L 3R9; Clifford G. Burrows, 9245 E. Saanich Rd., Sidney, B.C., Canada, V8L 1H6

[21] Appl. No.: 43,550

[22] Filed: May 29, 1979

[51] Int. Cl.³ .................................................. B62D 7/04
[52] U.S. Cl. ............................................ 280/81.5; 180/23; 180/140; 280/91; 280/99
[58] Field of Search ................. 280/81 A, 81 B, 81.5, 280/91, 99, 433; 180/23, 140

[56] References Cited

U.S. PATENT DOCUMENTS

| | | | |
|---|---|---|---|
| 2,502,946 | 4/1950 | Hart | 280/99 |
| 2,532,151 | 11/1950 | Dibert et al. | 280/423 |
| 2,560,501 | 7/1951 | Webster, Jr. et al. | 280/81.5 |
| 2,648,392 | 8/1953 | Brown | 180/23 |
| 2,906,358 | 9/1959 | Tucker, Sr. | 280/81.5 |
| 3,044,795 | 7/1962 | Standing et al. | 280/81 A |
| 3,048,422 | 8/1962 | Payne et al. | 280/81.5 |
| 3,237,957 | 3/1966 | Harbers | 280/683 |
| 3,380,547 | 4/1968 | Granryd | 180/139 |
| 3,591,203 | 7/1971 | Steiner | 280/426 |
| 3,740,070 | 6/1973 | Butler et al. | 280/683 |
| 3,873,129 | 3/1975 | Schmidt | 280/404 |
| 3,981,512 | 7/1976 | Westover | 280/81.5 |
| 4,010,816 | 3/1977 | Powell | 180/144 |

*Primary Examiner*—Joseph F. Peters, Jr.
*Assistant Examiner*—Donn McGiehan
*Attorney, Agent, or Firm*—Cole, Jensen & Puntigam

[57] ABSTRACT

A motorized vehicle having both steerable front wheels and driven steerable rear wheels. The front wheel suspension is such that a greater degree of turn is possible. The orientation of the rear wheels relative to the line of travel of the vehicle may be controlled by the operator or alternatively may be automatically oriented to properly track the front wheels. A zero center spool valve is mounted such that proper tracking is assured, an additional change in the front wheel angularity results in the appropriate and necessary change in their rear wheel angularity. The valve body is mounted to change its position in response to orientation of the rear wheels and the spool position is directly related to the orientation of the rear wheels such that appropriate relative positioning of the front wheels centers the spool terminating fluid flow to front wheel orientation controlling cylinders.

4 Claims, 10 Drawing Figures

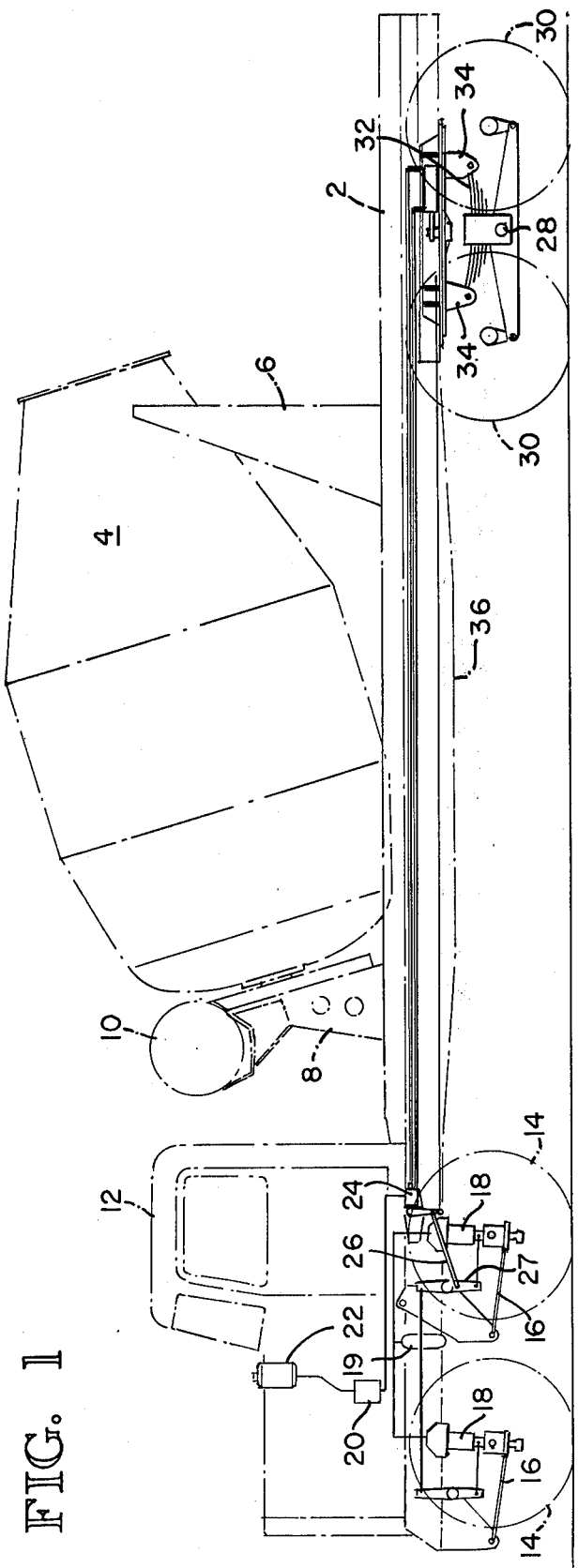
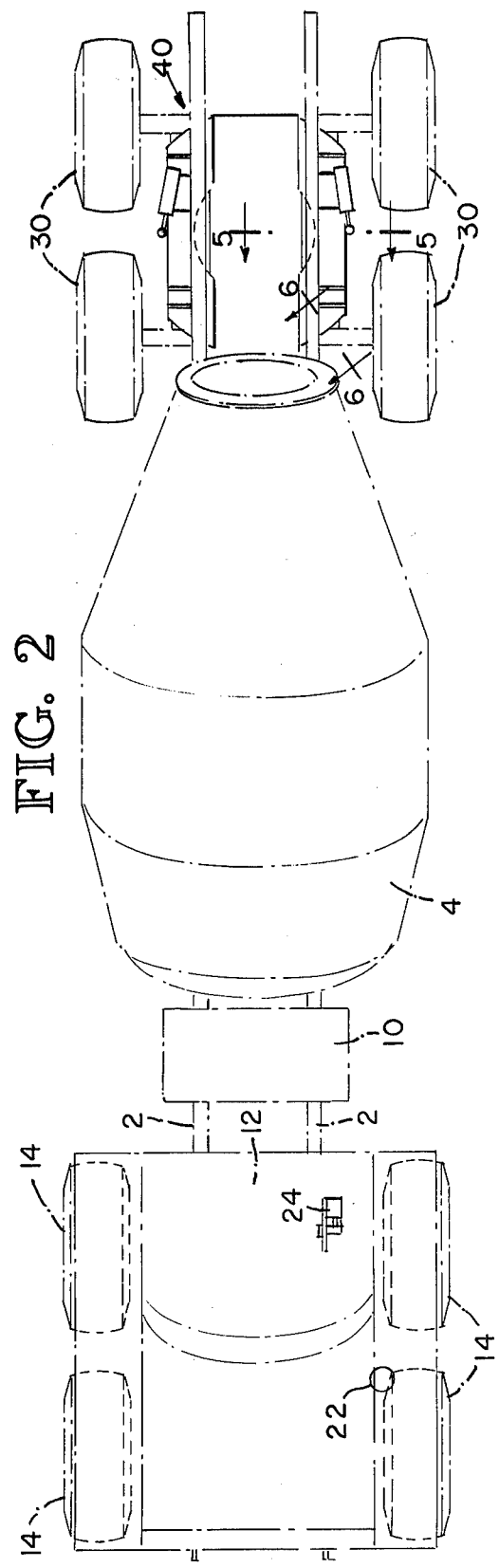

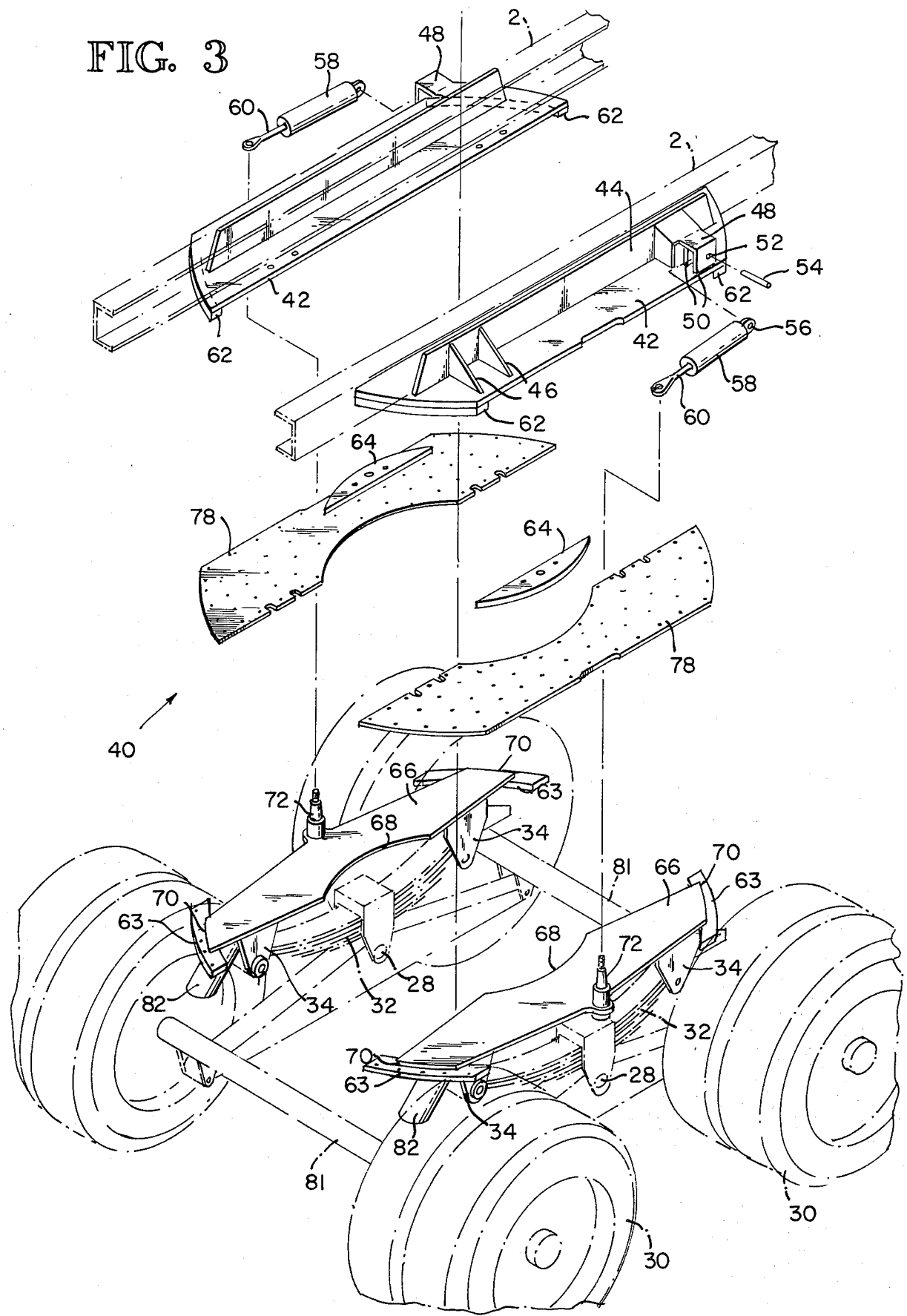

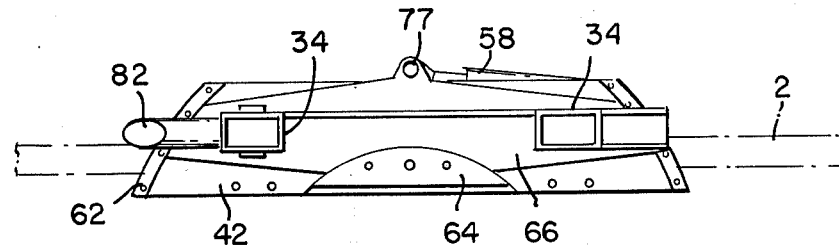
FIG. 4
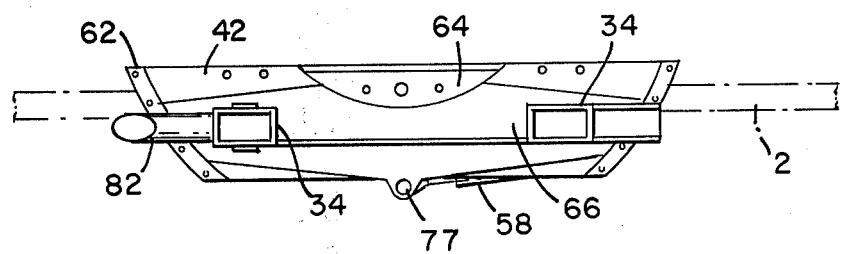
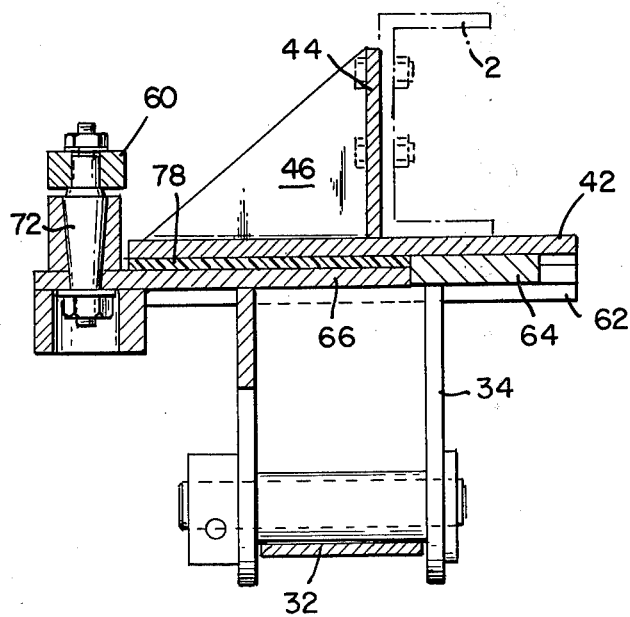
FIG. 5
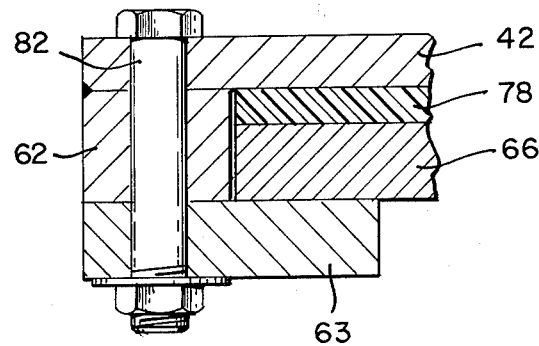
FIG. 6

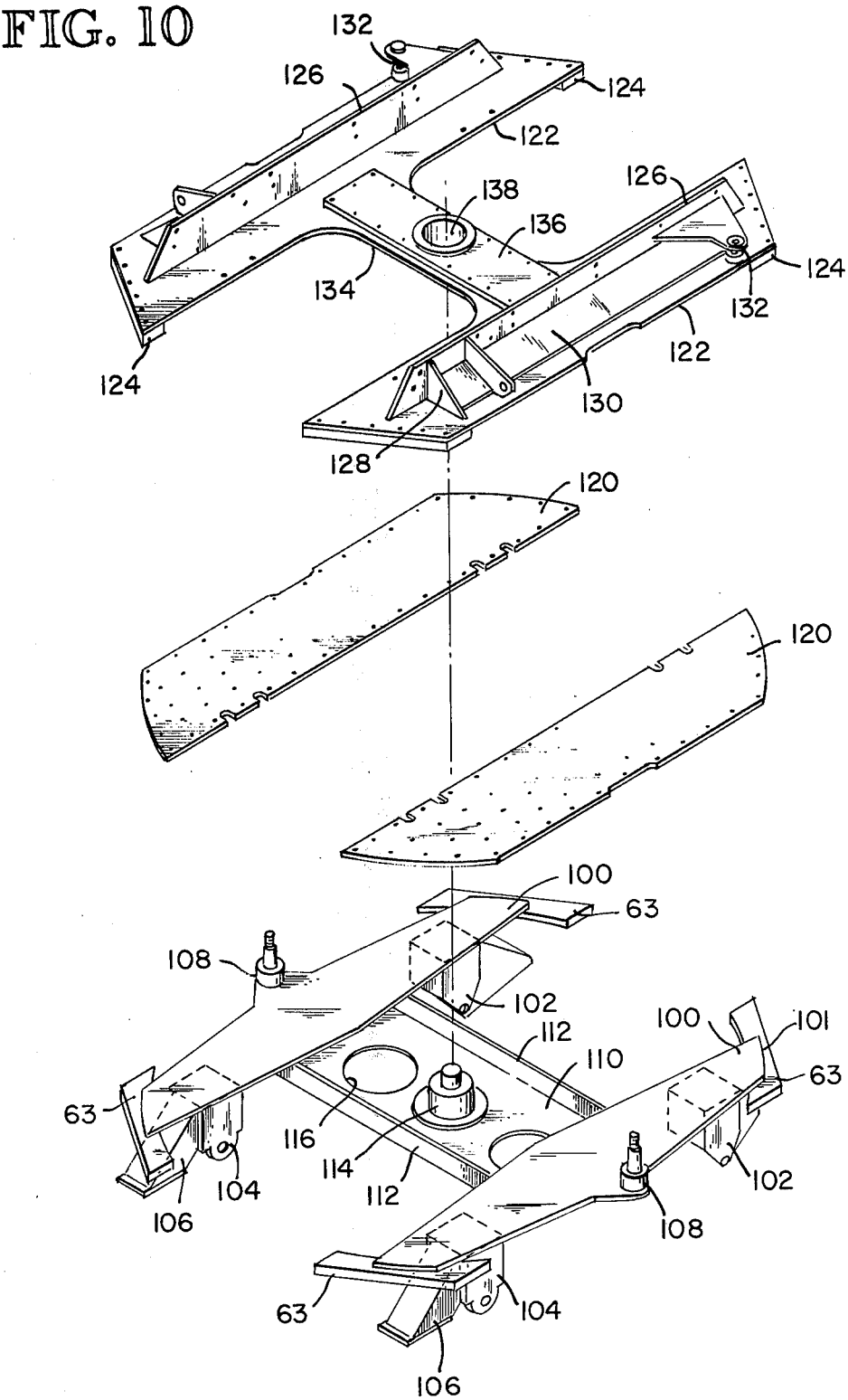

TRUCK WITH STEERABLE REAR WHEELS

BACKGROUND OF THE INVENTION

The motor driven vehicle, as is well known, has achieved substantial success as a means for transporting cargo. In many phases of industry it is imperative that the vehicle carry larger loads than heretofore deemed necessary or capable of economical handling. In general, larger loads require larger trucks and more load supporting axles. In addition to the requirement that the vehicle carry larger loads there are many portions of the industry where the vehicle must retain its maneuverability, a requirement in direct conflict with the greater size required.

A prime example of a particular industry wherein the vehicle is required to carry maximum loads and yet maintain maximum versatility in terms of positioning is the mining industry. An ore loader or the like must be able to maneuver sharp corners with minimal clearance within mining tunnels. Yet another industry which has similar requirements is the logging industry wherein the roads serpentine between trees and rock outcroppings. Still a further example of an industry requiring maximum loads and maximum versatility is the construction related industries requiring vehicles such as cement trucks to be able to deliver their loads to sites having very difficult access.

Particularly directing our comments to mining many vehicles have gone to both articulated frames and individually driven wheels in an attempt to satisfy the requirements. Another attempt to satisfy industry requirements is seen in tractor driven trailers wherein the wheels of a trailer are mounted upon a boggie which may be remotely steered from the vehicle thereby permitting the operator to have far greater maneuverability of his vehicle.

Still other vehicles have been designed wherein more than one set of wheels is capable of being steered and under the control of the operator.

Prior art references known to the inventor which deal with either modified suspension or multiple steerable wheels include U.S. Pat. No. 2,532,151 granted to Dibert et al Nov. 28, 1950 which teaches the concept of a steerable rear boggie for use with a trailer wherein the operator can direct fluid under pressure to pivot the boggie mounted upon a turntable beneath the frame of the trailer.

U.S. Pat. No. 2,648,392 granted to Brown Aug. 11, 1953 teaches the concept of mounting a truck cab and engine upon a trailer frame and having front wheels mounted on a turntable beneath the cab and thus pivotally rotatable with respect thereto.

U.S. Pat. No. 2,906,358 granted to Tucker Sr. Sept. 29, 1959 discloses a multiple rear wheel vehicle wherein two sets of boggies are mounted beneath the frame and each are rotatable with respect to the frame and driven by means of an interconnecting chain drive.

U.S. Pat. No. 3,048,422 granted to Payne et al Aug. 7, 1962 disclosing a steerable trailer having the rear wheels mounted upon a boggie which is pivotable relative to the trailer frame by means of forwardly extending arm and a fluid powered ram.

U.S. Pat. No. 3,591,203 granted to Steiner July 6, 1971 teaches a steering system for steerable rear wheels of a trailer vehicle. A sending piston cylinder arrangement is connected to the front wheels of the trailer and the output therefrom is connected to the rear wheels assuring that as the towing vehicle turns the towed vehicle assumes a tracking orientation.

U.S. Pat. No. 3,873,129 granted to Schmidt Mar. 25, 1975 discloses a steerable log trailer having a pivotal rear boggie movable relative to the reach guide and controlled by a pair of opposing fluid cylinders mounted to the reach guide.

U.S. Pat. No. 3,981,512 granted to Westover on Sept. 21, 1976 discloses a rear wheel steering system for trailers wherein the rear wheels are supported upon a boggie which is movable relative to the frame and kept in position by guide pins serving as followers within a groove in an overlying plate.

U.S. Pat. No. 4,010,816 granted Mar. 8, 1977 to Powell discloses the utilization of two fluid operating cylinder assemblies secured between the bunk of a trailer and the rear frame position enabling controlled relative movement between the frame portion and the load. The cylinder assemblies are actuated independently of the engine and the steering mechanism and fluid under pressure is applied by a pump driven by electric motor mounted to the trailer itself.

BRIEF DESCRIPTION OF THE DRAWINGS

FIG. 1 is a side elevation view of a cement truck having an extended frame and four axles to enable a greater load carrying capacity and having steerable rear wheels for maneuverability.

FIG. 2 is a top plan view of the truck of FIG. 1.

FIG. 3 is an exploded view of the turntable portion supporting the rear wheels of the truck of FIG. 1.

FIG. 4 is a top plan view of the turntable portion of the truck of FIG. 1.

FIG. 5 is an enlarged view taken along line 5—5 of FIG. 2.

FIG. 6 is an enlarged view taken along lines 6—6 of FIG. 2.

FIG. 10 is an exploded view of another means of mounting the steerable rear axles upon the truck of FIG. 1.

DETAILED DESCRIPTION OF THE DRAWINGS

Figure 7:
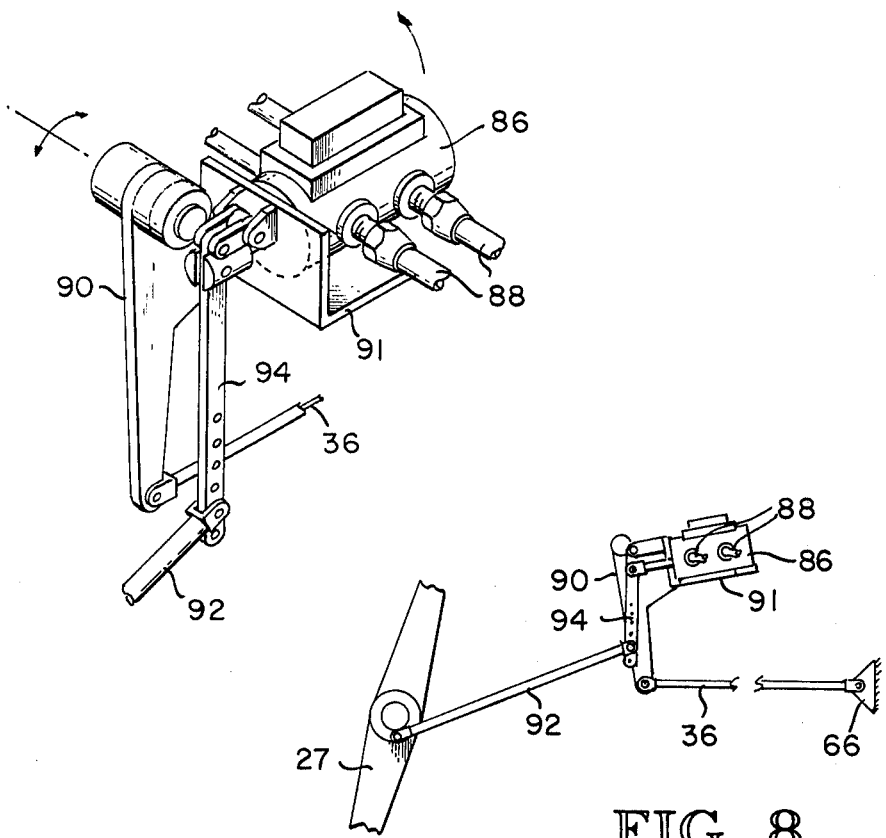
FIG. 7 is an enlarged isometric view of the control valve for the rear steering mechanism.

As seen in FIG. 1, the present invention is placed upon a cement truck having an extended subframe 2 upon which is mounted a mixer 4, supported by members 6 and 8 and having a water tank 10. All of the above noted members, 4, 6, 8 and 10 are mounted upon track members not shown in detail such that the load can be located on the frame for efficient weight distribution during travel and moved to the rear of the frame for offloading if desired. This movement of the mixer permits the truck to carry greater loads without exceeding load limits on either of the sets of supporting axles.

The truck upon which the invention is shown also includes a standard cab 12 mounted above steerable front wheels 14 which are interconnected with the vehicle by means of shortened springs 16, short springs 16 are pivotably secured to the frame or rigid extensions thereof at their forward end secured to hydraulic rams 18 at their rear end. Each pair of hydraulic rams, i.e.

those along one side of the vehicle are interconnected by means of a hydraulic hose including an interconnected accumulator 19 whereby the combination and interconnection operates as a fluid walking beam. The utilization of the shorter spring 16 in conjunction with the shock absorbing rams permits the front wheels to turn at sharper angles without interference with the supporting structure.

Also seen in this view and explained in greater detail hereinafter is shown 20, a pump, a reservoir 22 and the necessary interconnecting plumbing to a zero-center spool valve 24. It is to be noted that a control arm 26 interconnects the spool as explained hereinafter, with a portion of the steering mechanism. The rigid interconnection from the valve body may be to the rear turn table or some other appropriate mechanism. In short, the relative movement between the valve body and the spool is caused by a change in orientation between the front and/or rear wheels. The valve, as explained hereinafter, hydraulically assures appropriate and coincident orientation.

As seen at the rear end of the vehicle, a boggie 28 supports rear wheels 30 and is mounted to the framework by means of a spring member 32 secured to downwardly depending bracket or ear members 34 which, as explained hereinafter, are secured to a turntable captured within guide members. It is to be noted (FIG. 1) that a Bowden cable 36 extends from a portion of the turntable where it is dead headed to a control arm mounted to the valve body as explained in greater detail hereinafter.

Referring now to FIG. 2, the mixer 4 mounted upon the frame 2 as well as the cab 12, steerable front wheels 14 as well as the steerable rear wheels 30 can easily be seen. Also to be seen in this view is the top portion of the turntable and turntable retainer mechanism generally referred to as 40 which will be described in greater detail with reference to FIG. 3.

As seen in FIG. 3, the frame members 2 have secured thereto a portion of the control and vehicular support mechanism. As seen in this view, a pair of plates 42 are secured to an extend beneath the lower portion of the framework 2 on each side of the vehicle and extend horizontally outwardly therefrom. The plate member 42 is held rigidly in position contiguous with the frame member 2 by means of welding or the like. An upwardly extending flange member 44, which is contiguous with the outside of the frame member 2, and a plurality of triangular gussets 46 assure the rigidity of the plate 42 and flange member 44 is also welded to frame 2. At the after end of plate 42 is a bracket member 48 including a pair of downwardly extending ears 50 each of which has a bore 52 extending therethrough. Secured between the ears 50 by means of a pin 54 passing through the bores 52 is a hydraulic ram 58 including a rearwardly extending, pin receiving ear having a bore 56. Ram 58 has a piston rod 60 extending outwardly therefrom for interaction with a pin 72 as described hereinafter.

Secured to the bottom portion of plates 42 are minor arcs of a circle 62 secured to the outer edge of each of the plates 42 and thus forming a circular containment for a turntable as described hereinafter. Retainers 63 are secured to arc 62 to restrict relative vertical movement of the parts of the turntable. Likewise secured to the plates 42 are a pair of minor segments of a circle 64 which also serve as a portion of the turntable containment.

The turntable 66 has a curved interior void 68 which is complimentary to the segments 64 and curved outer edges 70 which are congruent with the interior surface of the minor arcs of the circle 62 which form the guides mounted to the plate 42. Thus, the turntable, when in operating position, is captured between arcs 62 and segments 64. Extending upwardly from the edge portion of the turntable 66 are pins 72 which are mated with the openings in the outer end of push rod 60. A bearing plate 78 is secured to the upper portion of each of the turntable sections 66 and underlies and permits easy relative movement between 66 and plate 42. Bearing plate 78 is manufactured of nylon or some other low friction material. Extending downwardly from each of the turntable sections 66 are a pair of ears 34 to which a spring member 32 is secured. The spring have pivotably mounted to the underside a linking member 80 interconnecting a pair of axles 81 upon which are mounted the wheels 30. Also secured at the lower portion of the turntable section 66 are downwardly extending axle stops 82 to limit the angular motion of the turntable about a horizontal axis.

Referring now to FIG. 4, the relationship of the various elements of the turntable mechanism is more readily apparent. As seen in this view taken from beneath the turntable, the centerline of the truck is denoted CL. The centerline CL passes between the frame members 2 to which are secured the plates 42 having the arcs 62 and the segments 64. The turntable 66 with its contiguous supports and pin base 77 may also be seen.

The enlarged FIG. 5 taken along lines 5—5 of FIG. 2 further illustrates the interrelationship of the frame member 2, the plate member 42 having its upwardly extending flange 44 and gussets 46. As seen in this view, the segment 64, in conjunction with the flange 62 when taken in conjunction with the pin 72 hold the plate 42 and the turntable as well as the frictionless member 78 in a relative operational position. Extending downwardly from the turntable are the ears 34 which support the spring members 32.

Referring now to FIG. 6, the interrelationship between the plate 42, the friction member 78 and the turntable 66 can more readily be seen. As seen in this view, the flange or minor arcs of the circle 62 can be seen to be bolted to the plate member 42. Also included is an inwardly extending flange member 63 which underlies the bottom of the turntable section 66 resisting vertical movement. The elements are secured together by welding in conjunction with a bolt member 82.

Referring now to FIG. 7, the valve which is secured to a rigid portion of the truck frame is shown in an enlarged scale. As seen in this view, the valve body member 86 having the necessary conduits 88 is pivotally secured to the frame member by means of a pivotable lever arm 90 having an integral bracket or valve mount 91. Lower arm 90 is secured by means of a Bowden cable 36 to a fixed attachment upon the turntable or some other portion of the steerable rear mechanism. The spool of the valve, not shown, is controlled by means of a lever arm 94 which extends downwardly therefrom. The arm 94 is secured by means of rigid rod 92 to a pitman arm or some other part of the front steering mechanism. The spool valve is specifically designed to have a very small neutral position such that any movement of the spool will generate relative movement of the turntable tending to center the spool. In operation, the truck driver will steer the front wheels and as a result of the movement of the pitman arm or the like, the lever 94 is moved thus moving the valve spool in relationship to the valve body. The valve senses this relative change and immediately allows hydraulic fluid to pass to the correct ram 58 causing the rear wheels to steer, again neutralizing the valve. The steering of the rear wheels is then sensed by the lever 90 via Bowden cable 36 moving the valve body to a center or neutral position at which time the steering action of the rear wheels is terminated until there is again a relative movement of the valve body and the valve spool. It can thus be seen that the steering of the rear wheels is automatically controlled with relationship to the steering of the front wheels. It is, of course, contemplated in this invention that the operator of the vehicle will have a manual override within the cab wherein he can cause the rear wheels to turn in the opposite direction of the front wheels to special maneuvers or to track as in a truck without the present invention.

Figure 8:
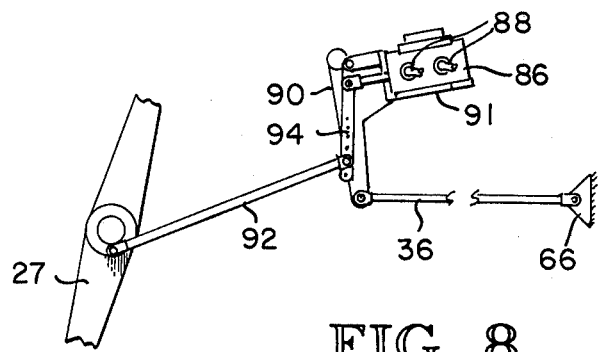
FIG. 8 is an elevational view of the valve of FIG. 7.

As seen in FIG. 8, a connecting rod 92 joins the pitman arm 27 or some other appropriate portion of the steering linkage with the arm 94 which is pivotably connected to the valve spool. Boden cable 36, which as noted above extends from a deadhead position on the rear turntable, is connected to arm 90 which forms a rigid extension of the bracket 91 which supports the valve body. As the vehicle turns, the pitman arm 27 will be moved causing the valve spool to move relative to the body thus causing, as noted hereinabove, the mechanism to operate until the spool valve is centered i.e. the hydraulic rams controlling the turntable are supplied with fluid causing the turntable to move appropriately thus pushing or pulling Bowden cable 36 causing the valve to again be centered. Thus it is readily apparent that the mechanism is self-regulating or controlling, requiring little operator attention.

Figure 9:
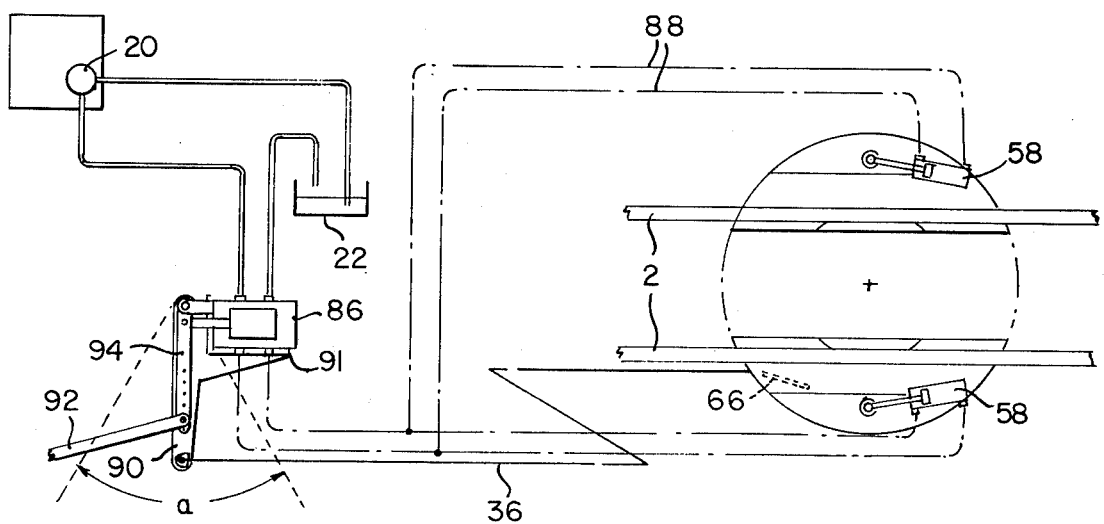
FIG. 9 is a schematic representation of the interrelationship of the steerable rear wheel section of the truck and the control valve.

Referring now to FIG. 9, it can be seen by way of the schematic that the valve support 91 integral a lever 90, is controlled by the Bowden cable connected to the turntable and will move independently of lever arm 94 connected to the valve stem and moved by rod 92 connected to the pitman arm 27. Boden cable 36 is connected to a portion of the turntable 66 which as described above is mounted to the boggie. Suitable conduits 88 feed from the valve 86 to each of the rams 58 such that one of the rams is extending the other contracting, thus controlling the movement of the turntable. Also seen in this view is the pump 20 and the reservoir 22, with suitable interconnecting conduits.

As seen in FIG. 10, yet another modification of the rear axle controlling turntable may be seen. As seen in this view, the turntable itself is shown having a pair of identical but opposite plate members 100 having downwardly depending bracket members 102, 104, interlocking with the spring member and thus supporting the wheels. Also to be noted in this view are the stop members 106 which control the amount of movement of the turntable about a horizontal axis. Extending upwardly from the plate 100, as explained hereinabove with respect to the other embodiment, are a pair of pins 108 upon which are secured the piston rods of the hydraulic rams which control the movement. Extending between the plates 100 is a linking plate 110 having vertical flanges 112 for strength and having an upwardly extending pin member 114. Also noted in this view are openings 116 to reduce the weight of the mechanism. Similarly to the embodiment described hereinabove, a pair of frictionless pads or bearing plates 120 overlie and are secured to the plates 100 and are fabricated of teflon or other material which serve to reduce the friction.

When assembled, the interconnecting element which overlies the plate 100 and friction reduction member 120 includes a pair of opposing plates 122 having downwardly extending curved flange members 124 which contact the outer curved edges 101 of plates 100 and help retain the relative position of plates 100 and their supported wheel mechanisms. Retainer 13 limits the vertical movement of the turntable elements. Extending upwardly from plate 122 is a vertical flange 126 rigidified and supported by gusset members 128 as well as plate member 130 which extends at an angle from plate 122 to flange 126. Also to be noted with respect to plate 122 are the mounting points 132 for the hydraulic rams which move plates 100 via pins 108.

Extending between plates 122 is a reinforced crossmember 134 having additional plate 136 welded thereon and having extended through the center thereof a reinforced sleeve 138 to receive and mate with the male pin element 114. As can readily be seen, the interaction of the edges 101 of plate 100 with the guide elements 124 mounted on plate 122 and the male pin member 114 and female sleeve member 138 substantially locks and fixes the relative position between the assembly positioning plates 122 and interconnecting member 134 attached to the framework of the vehicle and the assembly consisting of plates 100 and interconnecting member 110 which supports the rear wheels. This structure greatly decreases the amount of movement during starts and stops when the greatest stress is placed upon the interconnecting elements and yet permitting relative horizontal turning movement.

Thus, as can be seen the present invention provides a vehicle with steerable rear wheel boggies greatly increasing the maneuverability of the vehicle. The rear boggie is steerable to approximately 7° from either side of the center and is controlled by a spool valve, the spool of which is moved with respect to the body in response to the movement of the pitman arm or some other portion of the front steering mechanism and the valve body is controlled by a second lever arm which is connected by means of a Bowden cable or the like to the rear turntable. Thus, when the valve spool and the valve body are not centralized the valve directs hydraulic fluid to the appropriate ram member connected to the turntable thus moving the turntable about vertical axis until it is in a position whereat the valve spool is again at neutral.

What is claimed is:

1. An automatic steering system for use upon a vehicle having a driving position and a unitary frame supported by two or more sets of selectively steerable wheels longitudinally spaced along the frame which may simultaneously be given a complementary orientation by a single control device or alternatively oriented individually, comprising:

a first set of steering wheels functionally interconnected with a control device at the driving position, a turntable, movable through an arc substantially greater than 2°, to which a second set of wheels are mounted, said wheels being driving wheels and having an orientation entirely controlled by a self-centering hydraulic spool valve movably mounted to the framework and interconnected with the control device at the driving position, said valve means including an intermediate or neutral position and opposing extreme position selectively directing fluid to one of a pair of opposing hydraulic rams interconnected with and controlling the position of the turntable and attached second set of wheels such that when the valve is in the intermediate position, no additional fluid is directed to the rams and when it is in a position other than the intermediate position, additional fluid is directed to one of the rams, selectively urging the rear wheels to turn until the valve is in the intermediate position, means interconnecting the valve body to one set of wheels and means interconnecting the spool to the other set of wheels such that the condition of the valve depends upon the relative orientation of the two sets of wheels and when the two sets of wheels are properly tracking the valve is in the intermediate position holding the wheels in that orientation until the relative position of the spool is changed, and means to override the control device such that the operator may control the orientation of the second set of wheels independently from the first set.

2. A steering system as in claim 1, wherein the turntable comprises an upper plate means secured to the frame and a lower plate means secured to said second set of wheels, said lower plate means being retained in the appropriate relationship by means of complementary flange elements.

3. A steering system as in claim 2, wherein a low friction member is secured between the upper and lower plate means.

4. A steering system as in claim 3, and further including a central guide means.

* * * * *